(12) United States Patent
O'Loughlin (10) Patent No.: US 6,798,675 B1
(45) Date of Patent: Sep. 28, 2004

(54) CHARGING A CAPACITIVE ENERGY STORE USING ENERGY TRAPPING AND ADAPTIVE CLOCKING

(75) Inventor: James P. O'Loughlin, Placitas, NM (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 0 days.

(21) Appl. No.: 10/461,641

(22) Filed: Jun. 13, 2003

(51) Int. Cl.[7] ............................................. H02H 7/122
(52) U.S. Cl. ...................................... 363/56.01; 323/247
(58) Field of Search .................... 363/50, 55, 56.01, 363/56.02, 56.03, 56.04, 56.06, 56.09, 56.12; 323/234, 247, 908; 320/166

(56) References Cited

U.S. PATENT DOCUMENTS

| | | | |
|---|---|---|---|
| 4,109,192 A | * | 8/1978 | Burbank et al. ............ 320/166 |
| 4,336,587 A | * | 6/1982 | Boettcher et al. ............ 363/134 |
| 6,046,920 A | * | 4/2000 | Cazabat et al. .............. 363/136 |
| 6,606,259 B2 | * | 8/2003 | Cohen ...................... 363/56.01 |

* cited by examiner

Primary Examiner—Adolf Berhane
(74) Attorney, Agent, or Firm—James M. Skorich (57) ABSTRACT

A resonant switching-type capacitive charging power conditioner circuit includes a trap switch assembly to prevent the energy initially delivered to the circuit by an electrical energy source, from returning to the source. Once trapped, all of the energy is transferred to a capacitive store over a number of cycles. The period for each cycle is a function of the state of charge of the capacitive store, and the period decreases for each successive cycle as the charge on the capacitive store increases to its final value. Switches are turned on and off in response to the absence of certain currents in the circuit, to match the decreasing period of each successive energy transfer cycle throughout the entire energy transfer process. This adaptive clocking prevents energy from returning to the energy source, and eliminates dead time for each cycle.

23 Claims, 6 Drawing Sheets

CHARGING A CAPACITIVE ENERGY STORE USING ENERGY TRAPPING AND ADAPTIVE CLOCKING

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

FIELD OF THE INVENTION

This invention relates to the transfer of electrical energy from an energy source to a capacitive store and, more particularly, involves energy trapping and adaptive clocking of the energy transfer cycle in conjunction with a resonant circuit.

BACKGROUND

The charging of a capacitive energy store requires the transfer of energy from an energy source. Energy sources such as generators, batteries, fuel cells, and solar cells are typically voltage sources. The capacitive store initially appears as a short circuit when connected to a voltage source that has a voltage higher than that across the capacitive store. Consequently, the flow of current must be controlled.

Figure 1:
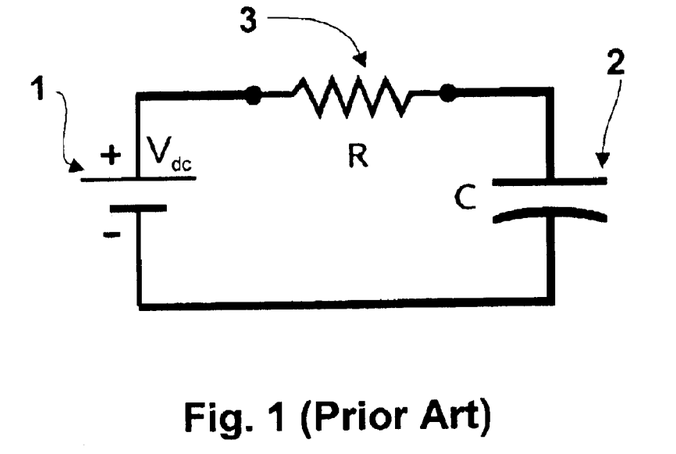
FIG. 1 is a schematic drawing showing a prior art circuit for resistive charging of a capacitor.

The simplest control means is a series resistor as shown in FIG. 1. Voltage source 1 having a voltage $V_{dc}$ charges capacitor 2, having a capacitance C, in series with resistor 3, having a resistance R. This circuit limits the peak current to a value of $V_{dc}/R$, and results in a relatively long charging time to achieve 99% $V_{dc}$, i. e., approximately 3RC seconds. The charging efficiency is only 50%; that is, resistor 3 dissipates the same amount of energy that is transferred to capacitor 2, or $C/2V_{dc}^2$. In some low-energy applications, resistive charging is the best engineering choice. However, in high-energy applications, the relatively long charging time or the 50% efficiency is unacceptable.

Figure 2:
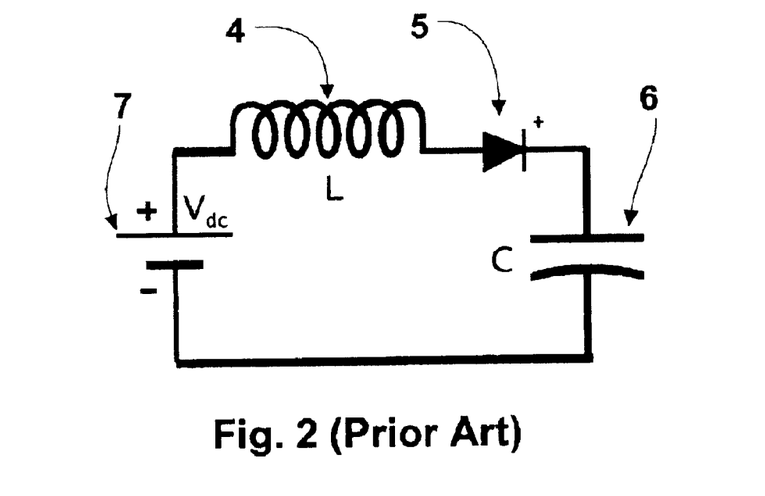
FIG. 2 is a schematic drawing illustrating another prior art circuit for resonant charging of a capacitor.

The charging time and efficiency are improved by resonant charging. This accomplished by replacing resistor 3 with an inductor 4, having an inductance L, as shown in FIG. 2. The theoretical efficiency of resonant charging approaches 100% and is typically greater than 95% in practice. The charging time is given by $\pi(LC)^{1/2}$ seconds, with the peak current being limited to $V/(LC)^{1/2}$. Diode 5 is used in the circuit because the capacitor 6 charges to almost twice the voltage of d.c. voltage source 7, $V_{dc}$, and it is necessary to prevent the charge transferred to capacitor 6 from flowing back into voltage source 7.

The peak energy storage rating of inductor 4 is one-fourth the energy rating of capacitor 6. The specific energy of a capacitor is on the order of 2000 J/kg, and that of an inductor is typically much less, on the order of 50 J/kg. Therefore, inductor 4 is typically on the order of 40 times larger than capacitor 6.

In moderate low-energy applications, such as pulsed radar transmitters, resonant charging is a good engineering choice. However, when the capacitive stored energy is greater than a few kJ, a better alternative for the charging apparatus is a switching-type capacitive charging power conditioner, or "SCCPC." The SCCPC operates from a d.c. source and provides fast and efficient charging of the capacitive store. In most applications, it also replaces the large d.c. power supply required for the input power by operating from a directly rectified a.c. power line. The SCCPC can also operate from any other suitable d.c. source, such as a battery.

A transformer is an important part of an SCCPC because it accommodates the difference between the voltage source and the load voltages, and isolates the voltage source from the load. Transformers must operate with bipolar voltages that contain no d.c. components. In general, transformers are inversely related in size and cost to the frequency of operation, which is motivation for operating the SCCPC at high frequency. There are two basic configurations of the SCCPC, the center-tapped transformer configuration shown in FIG. 3 and the "H" bridge switch configuration shown in FIG. 4.

Figure 3:
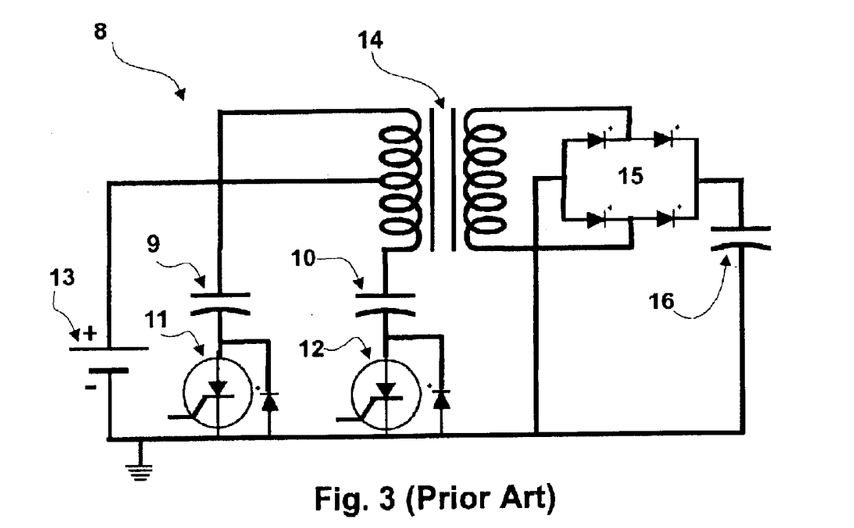
FIG. 3 is a schematic drawing of an SCCPC circuit of the prior art having a center-tapped transformer configuration.
Figure 4:
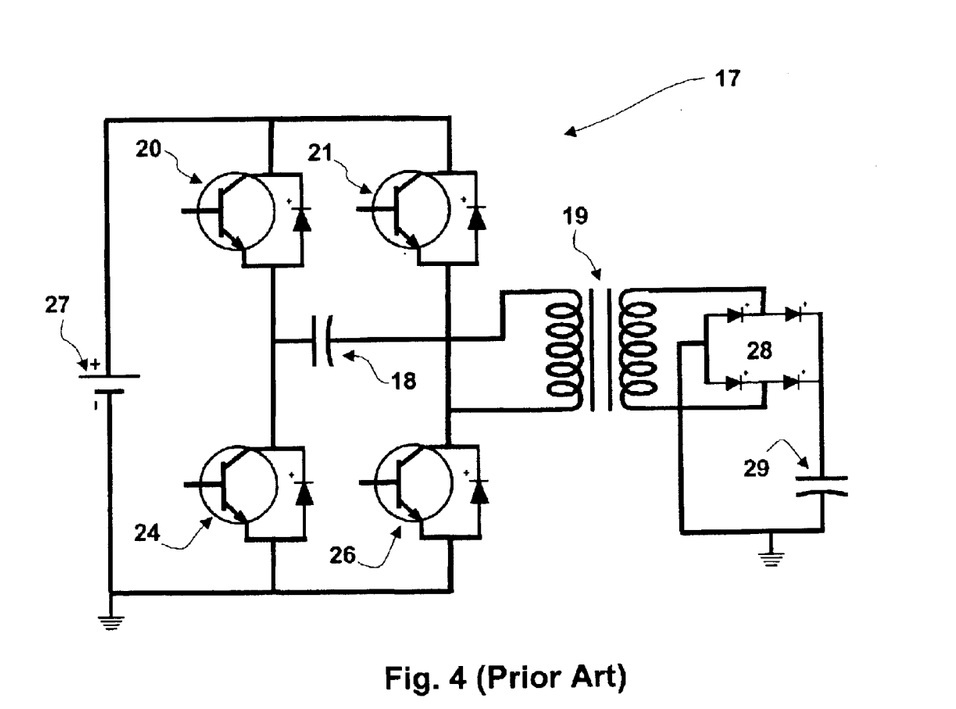
FIG. 4 is a schematic drawing of a SCCPC circuit of the prior art having an H-bridge configuration.

The principle of operation is the same for both SCCPC configurations. A small amount of energy is measured out by the primary capacitor, switched through the transformer, then rectified and deposited into the load capacitor. This process is repeated at a high frequency until the load capacitor is fully charged and in a manner such that the transformer is subjected to only a bipolar voltage.

More particularly, center-tapped configuration 8 of the prior art is schematically illustrated in FIG. 3. Center-tapped configuration 8 operates by alternately charging small capacitors 9 and 10 by means of switches 11 and 12, from voltage source 13, through the primary winding of transformer 14. Transformer 14 usually steps up the voltage by a factor of N, i. e., N is typically greater than 1, where N is the turns ratio of a transformers secondary and primary windings; but in some cases the voltage may be stepped down, i. e., N may be less than 1. The secondary current of transformer 14 passes through bridge rectifier 15 and then into load capacitor 16. This process is repeated at a high frequency such that over a period, load capacitor 16 is charged to the desired voltage. The switches 11 and 12 are operated in an alternating sequence such that the voltage applied to transformer 14 is bipolar and has no d.c. component.

H-bridge circuit 17 of the prior art is schematically shown in FIG. 4. H-bridge circuit 17 has only one small primary capacitor 18, which is charged through the primary coil of transformer 19. The H-bridge switches 20, 21, 24 and 26 are sequentially operated to alternately apply a bipolar voltage through capacitor 18 to transformer 19. Specifically, in the first energy transfer cycle, the switch pair 20 and 26 are turned on, while switch pair 21 and 24 remain in the off state. This connects the positive side of voltage source 27 through small primary capacitor 18 to the top of the primary coil of transformer 19.

After this energy transfer cycle is completed, the next energy transfer cycle begins with switch pair 21 and 24 being turned on while switch pair 20 and 26 are switched to the off state. This connects the positive side of voltage source 27 through primary capacitor 18 to the bottom side of the primary coil of transformer 19, thus providing the reverse polarity and ensuring that the bipolar signal received by transformer 19 has no d.c. component. This sequence of operating two the switch pairs is repeated until the required amount of energy is transferred through bridge rectifier 28 to load capacitor 29.

Figure 5:
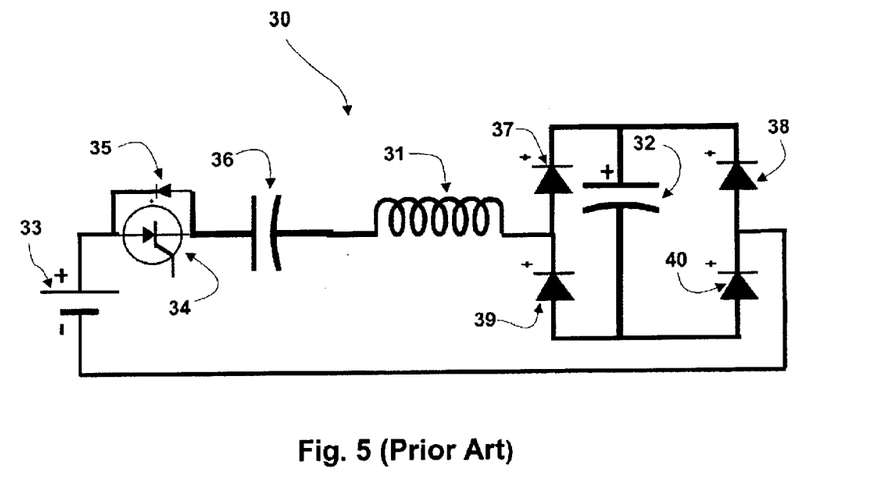
FIG. 5 is a schematic drawing of a simplified equivalent circuit of an SSCPC circuit that is suitable for the analysis of the operation of both the center-tapped transformer and the H-bridge SCCPC configurations respectively shown in FIG. 3 and FIG. 4.

The basic energy transfer process and the functions of the switches during a single switching event of the same polarity can be better explained using simplified equivalent circuit 30 shown in FIG. 5. Circuit 30 illustrates the operation of both center-tapped circuit 8 of FIG. 3 and H-bridge circuit 17 of FIG. 4.

Transformer 14 in circuit 8 of FIG. 3 and transformer 19 in circuit 17 of FIG. 4, are replaced in FIG. 5 by equivalent leakage inductor 31. The equivalent inductance of inductor 31 can be obtained by calculation familiar to those skilled in the electrical art, using the transformer turns ratio N. Likewise, load capacitor 16 in circuit 8 and load capacitor 29 in circuit 17 are represented by equivalent load capacitor 32. The capacitance of capacitor 32 can be calculated using equations and methods well known to those reasonably skilled in the electrical art. The voltage across load capacitor 32 divided by the voltage of source 33 is defined as the charge ratio α. Forward switch 34 is a silicon controlled rectifier, or "SCR," with parallel back diode 35. However, any suitable switch may be used, such as an isolated gate bipolar transistor, or "IGBT," or monolithic oxide silicon field effect transistor, or "MOSFET."

The operation of the switch cycle begins when forward switch 34 closes, i. e., is turned on. A resonant current flows from voltage source 33 through switch 34, through capacitor 36, through inductor 31, through the bridge rectifier formed by diodes 37, 38, 39 and 40, and into load capacitor 32. Being in a resonant circuit, the voltage across capacitor 36 will increase and ultimately exceed the voltage of the voltage source 33. When this occurs, forward switch 34 is turned off, and the current through capacitor 36 reverses and flows back through back diode 35, that is, across forward switch 34.

The reverse current deposits energy back into voltage source 33. This reverse current continues to provide a positive energy transfer to load capacitor 32 because the bridge rectifier allows only a positive flow of current into load capacitor 32, while at the same time routing the excess energy back to voltage source 33. As this reverse current continues to flow, it builds up an opposing voltage on capacitor 36 until the opposing voltage is sufficient to reduce the reverse current to zero. When the reverse current reaches zero, the energy transfer cycle is completed. Forward switch 34 is then turned on and the next energy transfer cycle is begun.

It can be shown that the energy transferred to load capacitor 32 is a function of the state of charge of load capacitor 32, and that the fractional transfer is very low when state of charge across load capacitor 32 is low. More particularly, the fractional amount of the energy transferred to capacitor 32 relative to the energy that is delivered to the circuit from voltage source 33, also known as the energy transfer ratio, is given by the following equation:

$$J(G, \alpha) = 8(1-G)[G(1-2\alpha)-1]\frac{[\alpha(1-G)-2]}{(1+G)^4 G} \quad (1)$$

where G=the ratio of the capacitance of capacitor 32 to the capacitance of capacitor 36, typically 100 to 10,000.

During the initial stages of the charging process begins, the voltage on capacitor 32 is very low, and thus α≅0. Under this condition, the energy transfer ratio J(G, α) simplifies to the following expression:

$$J(G) = \frac{4G^2}{(G+1)^3} \quad (2)$$

Accordingly, the transfer ratio J(G, α) is very low during the initial stages of the charging process, e. g., J(G, α)≅0.004 for G=1000.

As the voltage builds up on capacitor 32, α increases, and thus the transfer ratio J(G, α) also increases. Nonetheless, the average energy transfer ratio taken over the entire charging process is low, and this inefficiency requires a large number of cycles to achieve a useful energy transfer to capacitor 32. The energy not transferred to capacitor 32 from the energy delivered to circuit 30 during each cycle is returned to voltage source 33 by the reverse current.

Each energy transfer cycle is of a short duration and is repeated at a high frequency to accomplish the total energy transfer to load capacitor 32. The high frequency is a major factor in reducing the size of the transformer and thus the size and cost of the apparatus. However, the high frequency concomitantly imposes a high switching loss because the amount of energy that must be processed is much larger that the amount actually delivered to load capacitor 32.

The period of the energy transfer cycle, T, is also a function of the state of the charge ratio α of load capacitor 32. The following expressions approximate T for two conditions, $T_1$ for α≤⅔, i. e., during the initial cycles of the charging process, and $T_2$ for α>>⅔, i. e., during the latter cycles of the charging process:

$$T_1 = 2\pi\sqrt{LC_1\frac{G}{1+G}} \quad \text{when } \alpha \leq \frac{2}{3} \quad (3)$$

$$T_2 = \pi\sqrt{LC_1\frac{G}{1+G}} \quad \text{when } \alpha \rangle\rangle \frac{2}{3} \quad (4)$$

where:

L=the inductance of inductor 31; and

C=the capacitance of capacitor 36.

At the present time SCCPC's are driven at a fixed frequency selected to accommodate the maximum charging cycle period that occurs at the beginning of the charging process, i. e., before the charge on load capacitor 32 has appreciably increased. As a result, the period is much longer than that necessary during the latter stages of the charging process, i. e., when α has significantly increased. Consequently, during a substantial portion of the total time necessary to complete the transfer of energy from voltage source 33 to load capacitor 32, i. e., during the latter stages of the charging process, approximately 50% of each charging cycle period is comprised of dead time, i. e., the period exceeds that which is necessary to drive the circuit.

It follows that there is a need in the art for a charging apparatus capable of transferring all of the energy taken from the voltage source in each switching cycle, while matching the clocking frequency to the period required for energy transfer for each cycle throughout the charging process.

SUMMARY

A resonant switching-type capacitive charging power conditioner circuit includes a trap switch assembly to prevent the energy initially delivered to the circuit by an electrical energy source from returning to the source. Once trapped, all of the energy is transferred to a capacitive store, such as a load capacitor, over a number of cycles. The period for each cycle is a function of the state of charge of the capacitive store, and the period decreases for each successive cycle as the charge on the capacitive store increases to its final value. Switches are turned on and off in response to the absence of certain currents in the circuit, to match the decreasing periods of the successive charging cycles, respectively, throughout the charging process. This adaptive clocking prevents energy from returning the energy source, and eliminates dead time for each cycle.

Other aspects and advantages of the present invention will become apparent from the following detailed description,

DETAILED DESCRIPTION

Figure 6:
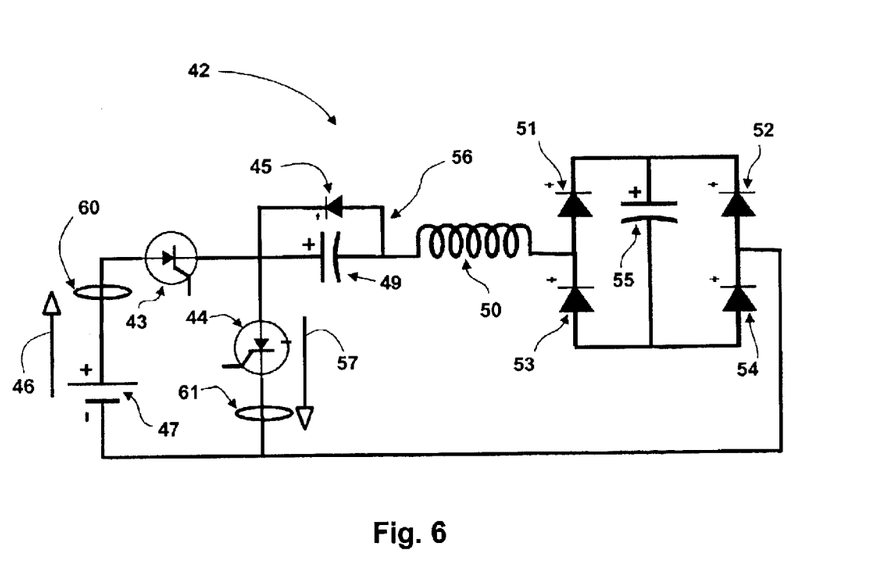
FIG. 6 is a schematic drawing of the circuit of the present invention.

The invention is comprised of an energy trapping innovation and adaptive clocking that maximizes the utilization of the trapping process. Referring to FIG. 6, circuit 42 includes start switch 43, trapping switch 44 and clamping diode 45. A controlled switch may replace clamping diode 45. The energy transfer cycle begins when start switch 43 is turned on (closed), with trapping switch 44 being in the off state (open). Current 46 flows as indicated from voltage source 47, through start switch 43, capacitor 49, inductor 50, the bridge rectifier comprised of diodes 51, 52, 53 and 54, and into the positive side of load capacitor 55. Load capacitor 55 is connected to the load terminals of the bridge rectifier. The configuration of diode 45 in parallel with capacitor 49 comprises clamping circuit 56.

As current 46 flows in the indicated direction, the voltage on capacitor 49 builds up to a level that exceeds the voltage of voltage source 47, and results in reducing current 46 to zero. The time $t_1$ required for current 46 to decrease to zero as measured from the moment start switch 43 closed, is given by solving the following equation:

$$t_1 = \pi \sqrt{LC_1 \frac{G}{1+G}} \qquad (5)$$

where:

L=the value of the inductance of inductor 50;

$C_1$=the capacitance of capacitor 49; and

G=the ratio of the capacitance of load capacitor 55 to $C_1$.

At the end of $t_1$, current 46 is zero and start switch 43 is placed in the off (open) state to isolate voltage source 47 from circuit 42. Trapping switch 44 is simultaneously switched on (closed), and the voltage across capacitor 49 causes current 57 to pass through trapping switch 44 in the direction indicated, to the bridge rectifier. Current 57 flows through the bridge rectifier and deposits charge and energy into the positive terminal of load capacitor 55, before returning through inductor 50 to complete the circuit back to clamping circuit 56. The flow of current 57 is resonant and would cause a reversal of the voltage on capacitor 49 except that a voltage reversal is prevented by diode 45 of clamping circuit 56.

The time $t_2$ required for the voltage on capacitor 49 to decrease from its value at the end of interval $t_1$, to zero, is calculated by the following equation:

$$t_2 = \frac{\pi}{2\omega_2} \qquad (6)$$

where:

$$\omega_2 = \frac{1}{\sqrt{LC_1 \frac{G}{1+G}}} \qquad (7)$$

As diode 45 prevents capacitor 49 from being charged by reverse current 56, eventually the voltage across capacitor 49 decays to zero, whereupon the only energy remaining in circuit 42 and not yet transferred to load capacitor 55, is stored in inductor 50. Current 57 continues to flow, induced by the magnetic field of inductor 50, until all of the energy stored in inductor 50 is delivered through the bridge rectifier to load capacitor 55. The time $t_3$ required to transfer the energy stored in inductor 50 to load capacitor 55, measured from the time the voltage across capacitor 49 becomes zero, i. e., at the end of $t_2$, until current 57 decays to nothing, is given by the following equation:

$$t_3 = \frac{1}{\omega_3} \sin^{-1}\left[\sqrt{\frac{G(1-2\beta)-1}{G(1+G\beta^2)}}\right] \qquad (8)$$

where:

$$\omega_3 = \frac{1}{\sqrt{LGC_1}} \qquad (9)$$

and β=the ratio of the voltage across load capacitor 55 measured at the beginning of the energy transfer cycle, i. e., just prior to the closing of start switch 43, to the voltage of voltage source 47.

The total time T to accomplish one energy transfer cycle including the trapping is given by the sum:

$$T = t_1 + t_2 + t_3 \qquad (10)$$

Figure 7:
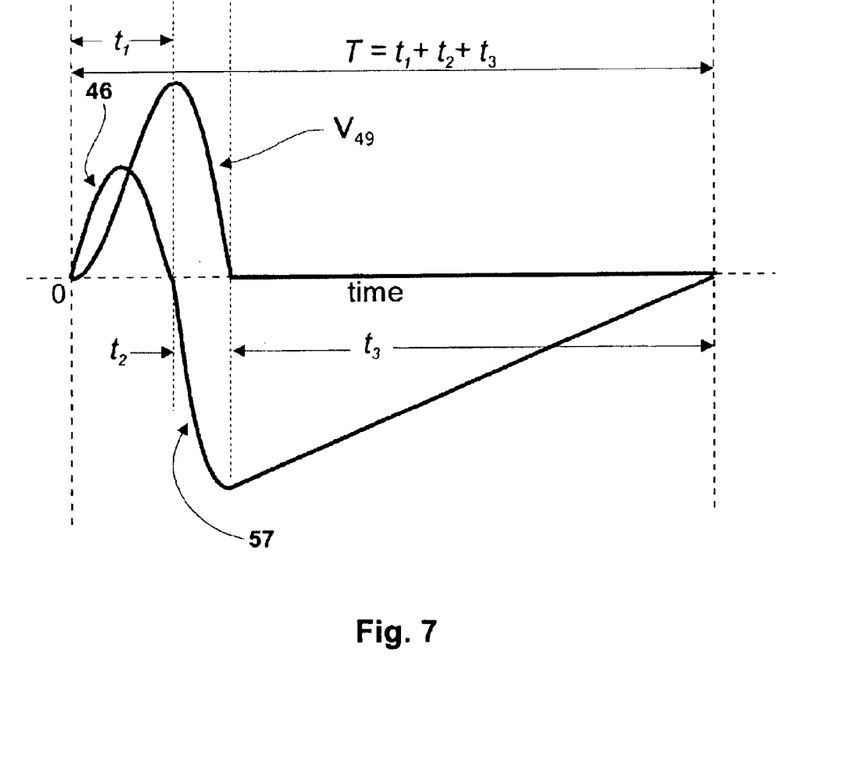
FIG. 7 is a graph of the significant voltage and currents in the circuit of the present invention.

T depends upon the initial state of charge in terms of the charge ratio β at the beginning of each charging cycle, and consequently will change for each cycle during the charging process. More particularly, T is at its maximum at the beginning of the charging process, and decreases as the voltage on the load capacitor 55 increases. Typical graphs of currents 46 and 57 as a function of time are shown in FIG. 7. Also shown therein is a graph of the voltage, $V_{49}$, across capacitor 49 as a function of time.

As previously noted, the time interval $t_1$, is the duration of the energy or current flow delivered from voltage source 46 to circuit 42, and corresponds to the positive part of the trace of current 46 as it rises from zero to a maximum value and then decreases back to zero. During the interval $t_1$, the voltage $V_{49}$ rises from zero at the start of the cycle, to a peak value at the end of $t_1$.

The time interval $t_2$ begins at the end of $t_1$, and is defined as the interval from when current 57 is zero until the current reaches its peak negative value. $t_2$ may also be defined as the interval necessary for the voltage $V_{49}$ to decay from its peak value to zero.

The time interval $t_3$ begins at the end of $t_2$. The voltage $V_{49}$ across capacitor 49 is clamped to zero by clamping diode 45, while current 57 decays from its peak negative valued at the end of $t_2$ to zero at the end of $t_3$. The intervals may be approximated using equations 5 through 9.

To maximize the utilization of the charging circuit and to achieve the shortest over-all charging time, the actual periods of the individual energy transfer cycles should start off long and decrease to match the theoretical period for each particular cycle, as calculated by equations 5 through 10. The adaptive clocking aspect of the invention, as discussed below, accomplishes this.

The proper operation of circuit 42 depends upon the operation of the switches 43 and 44 in a precise sequence. The times at which these two switches should operate can be theoretically calculated, using equations 5 through 9, as a function of the intervals $t_1$, $t_2$, and $t_3$. However, this is not practical for real applications because of unpredictable effect of thermal drift, aging and vibration on the various electrical elements.

The beginning and end of intervals $t_1$, $t_2$, and $t_3$, can be determined by measuring or sensing currents 46 and 57 as a function of time. More particularly, current measuring means 60 measures current 46, and current measuring means 61 measures current 57. Methods and means for the measurement of electrical currents are well known and can be easily implemented by those skilled in the electrical art, e. g., viewing shunts, Hall devices and current transformers.

The charging of load capacitor 55 begins by commanding switch 43 to an on state (closed). The end of interval $t_1$ occurs when value of current 46, as measured by measuring means 60, returns to zero after reaching a positive peak. Switch 43 is then commanded off (open) and switch 44 is commanded on (closed), to begin interval $t_2$. Methods and means for generating switch commands based on the values of currents are well known to those reasonably skilled in the relevant art.

Current 57, as measured by measuring means 61, increases in magnitude until it reaches a negative peak value, marking the end of $t_2$ and the beginning of $t_3$. Current 57 then decays to zero, signifying the end of $t_3$ as well as the end of the charging cycle period T.

The beginning of the following energy transfer cycle occurs at the end of $t_3$ (and T), with commands to turn on (close) switch 43 and turn off (open) switch 44, as previously explained. The energy transfer process continues with successive cycles until load capacitor 55 is fully charged, i. e., the transfer of energy from voltage source 47 is completed. The sequential turning on and off of switches 43 and 44 in accordance with the measurements of currents 46 and 57 by measuring means 60 and 61, respectively, i. e., by responding to the signals generated by measuring means 60 and 61, can be automated using means and methods well know to those reasonably skilled in the art.

Figure 8:
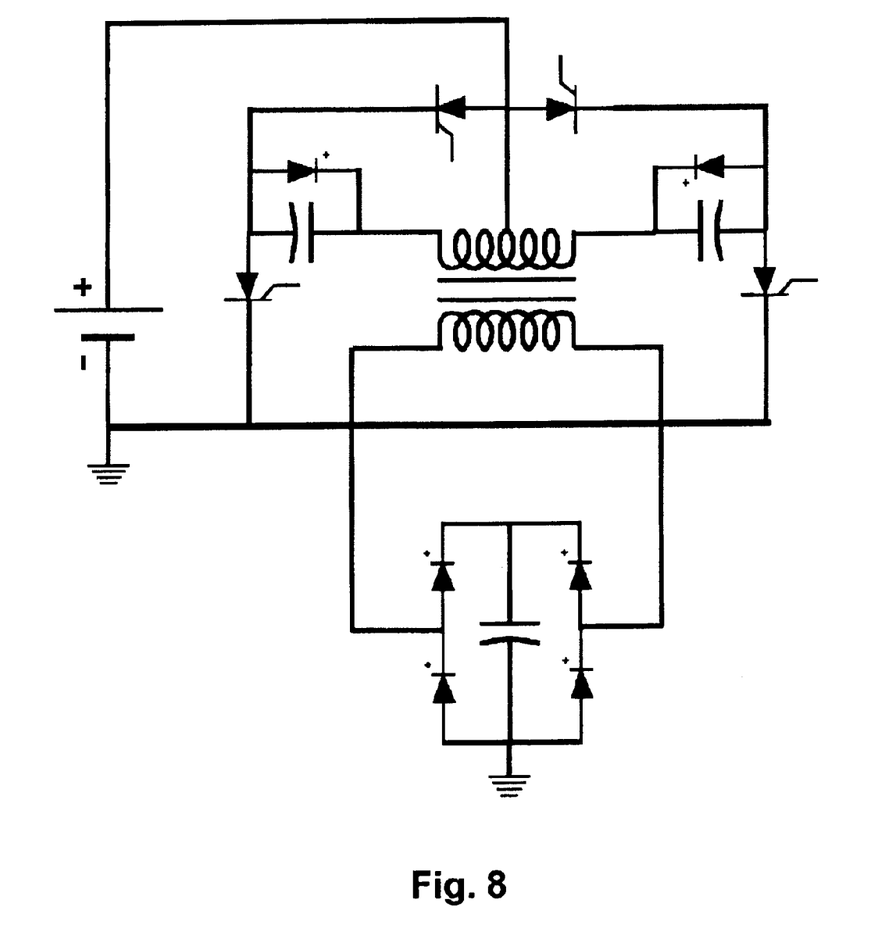
FIG. 8 is a schematic drawing of the center-tapped transformer configuration of the circuit of the present invention.
Figure 9:
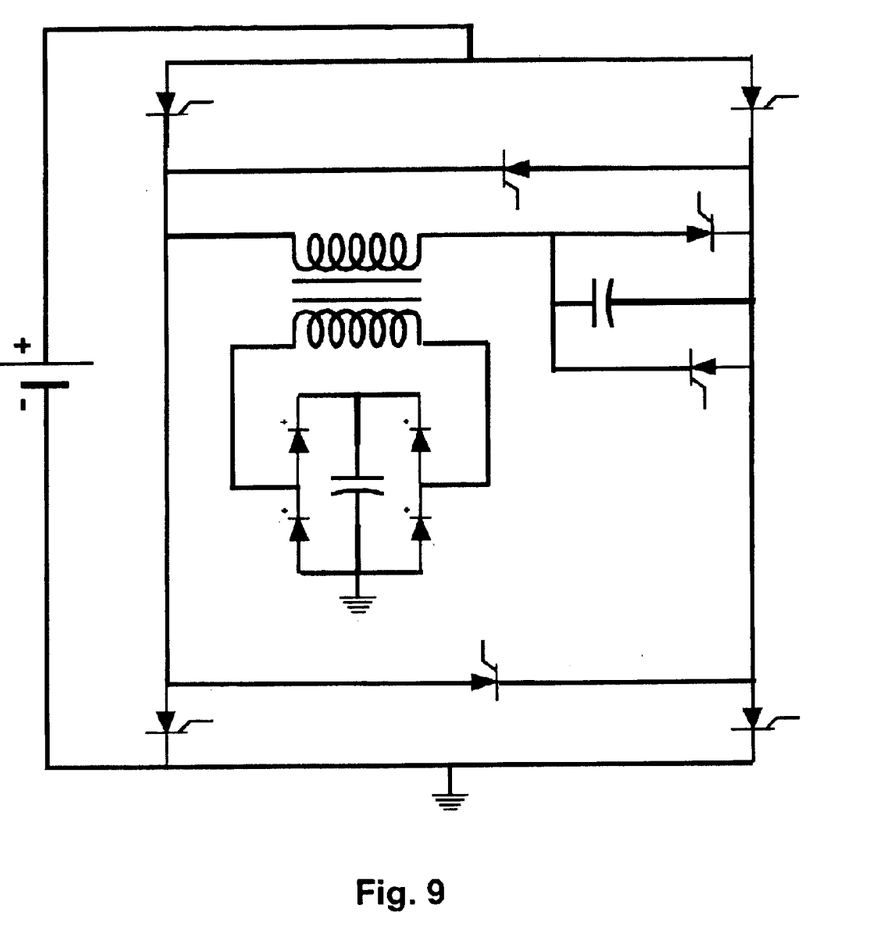
FIG. 9 is a schematic drawing of the H-bridge switched configuration of the circuit of the present invention.

FIG. 8 is a schematic drawing of the present invention implemented in a center-tapped transformer configuration. FIG. 9 is a schematic drawing of the present invention implemented in a H-bridge switched configuration. Conventional symbols are used to represent the various electrical elements included therein. In each configuration, the transformer provides the equivalent inductance provided by inductor 50 of circuit 42. The foregoing configurations are examples of the present invention, and their operation is obvious to one skilled in the electrical art in view of the detailed description of the circuit 42, in addition to the explanations of the operation of circuits 8 and 17 shown in FIGS. 3 and 4, respectively.

It is to be understood that the preceding is merely a detailed description of one embodiment of this invention and that numerous changes to the disclosed embodiment can be made in accordance with the disclosure herein without departing from the spirit or scope of the invention. The preceding description, therefore, is not meant to limit the scope of the invention. Rather, the scope of the invention is to be determined only by the appended claims and their equivalents.

What is claimed is:

1. An electrical circuit for transferring energy from an energy source having a source voltage, to a capacitive store, comprising:

a starter switching means for closing to electrically communicate an initial current from the energy source, with a capacitive means;

a rectifier means electrically communicating with the capacitive means, for charging the capacitive store with energy from the initial current;

the capacitive means having a variable capacitive voltage opposing the source voltage, for reducing the initial current to a null magnitude, and also for generating a reverse current when the capacitive voltage exceeds the source voltage;

the starter switching means also for opening when the initial current decreases to a null magnitude;

the capacitive means electrically communicating with a trap switching means;

the trap switching means being for closing when the reverse current is generated, for electrically communicating the reverse current with the rectifier means when closed, and for opening when the reverse current has a null magnitude; and the rectifier means also for charging the capacitive store with energy from the reverse current, whereby the capacitive store is being charged by both the initial current and the reverse current.

2. An energy transfer circuit as defined by claim 1, further comprising:

a clamping means being electrically in parallel with the capacitive means, for allowing the reverse current to bypass the capacitive means; and the clamping means and the capacitive means comprising a clamping circuit, whereby the reverse current is prevented from effecting the capacitive voltage.

3. An energy transfer circuit as defined by claim 2, further comprising an inductance means for inducing the reverse current when the capacitive voltage decays to a null magnitude.

4. An energy transfer circuit as defined by claim 2 wherein:

the circuit includes a transformer having a primary winding and a secondary winding;

the secondary winding electrically communicates with the rectifier means and the capacitance store;

the primary winding electrically communicates with the starter switching means, the clamping means, and the trapping switch means; and the transformer comprising an inductance for inducing the reverse current when the capacitive voltage decays to a null magnitude.

5. An energy transfer circuit as defined by claim 4 wherein the circuit comprises a center-tapped transformer configuration.

6. An energy transfer circuit as defined by claim 4 wherein the circuit comprises an H-bridge switched configuration.

7. An energy transfer circuit as defined by claim 3 wherein the circuit comprises a switching-type capacitor charging power conditioner.

8. An energy transfer circuit as defined by claim 3, further comprising:
a first measuring means for measuring the initial current;
a second measuring means for measuring the reverse current;
the starter switching means being responsive to a first signal generated by the first measuring means; and
the trap switching means being responsive to a second signal generated by the second measuring means.

9. An energy transfer circuit as defined by claim 3 wherein the rectifier means is comprised of a bridge rectifier circuit.

10. An energy transfer circuit as defined by claim 3 wherein:
the rectifier means is for generating a rectified current from the initial current and the reverse current; and
the capacitance store is continually charged by the rectified current.

11. An energy transfer circuit as defined by claim 3 wherein:
the initial current flows in a first direction relative to the capacitive means;
the reverse current flows in a second direction relative to the capacitive means; and
the first direction is opposite the second direction.

12. An energy transfer circuit as defined by claim 3 further comprising:
an energy transfer cycle having a start that includes closing the starter switching means with the trap switching means being open;
the cycle including opening the starter switching means and closing the trap switching means, after the start; and
the cycle having an end that includes opening the trap switching means.

13. An energy transfer circuit as defined by claim 12 wherein:
an energy transfer process is comprised of a successive number of the cycles; and
the energy transfer process is completed when a substantial portion of electrical energy is transferred from the energy source to the capacitive store.

14. An energy transfer circuit as defined by claim 3 further comprising:
an energy transfer cycle having a start that includes having the initial current electrically communicate with the capacitive means;
the cycle including having the initial current decrease to a null magnitude;
the cycle also including having the reverse current electrically communicate with the trap switching means after the initial current has decreased to a null magnitude; and
the cycle having an end that includes having the reverse current decay to a null magnitude.

15. An energy transfer circuit as defined by claim 14 wherein:
an energy transfer process is comprised of a successive number of the cycles; and
the energy transfer process is completed when a substantial portion of electrical energy is transferred from the energy source to the capacitive store.

16. A method of transferring energy from an energy source having a source voltage, to a capacitive store, comprising:
electrically communicating an initial current from the energy source, with a capacitive means until the capacitive means has an opposing voltage that reduces the initial current to a null magnitude;
generating a reverse current in the opposite direction of the initial current after the opposing voltage exceeds the source voltage;
preventing the reverse current from charging either the energy source or the capacitive means;
generating a rectified current from the initial current and the reverse current;
charging the capacitive store with the rectified current; and
repeating the foregoing steps when the reverse current decays to a null magnitude, whereby
the energy flowing out of the energy source is transferred to the capacitive store, and the capacitive store is being continually charged by the rectified current.

17. The method of transferring energy as defined in claim 16 wherein generating the rectified current from the initial current and the reverse current includes:
sensing the reverse current and transmitting a first signal in the presence of the reverse current and a second signal in the absence of the reverse current;
opening a starter switch located in series between the energy source and the capacitive means, and closing a trapping switch located in series between the capacitive means and a rectifier means, responsive to the first signal; and
subsequently closing the starter switch and opening the trapping switch responsive to the second signal, whereupon
the foregoing steps are repeated.

18. The method of transferring energy as defined in claim 17 wherein generating the rectified current from the initial current and the reverse current includes:
sensing the initial current and transmitting a first signal in the absence of the initial current;
sensing the reverse current and transmitting a second signal in the absence of the reverse current; and
opening a starter switch located in series between the energy source and the capacitive means, and closing a trapping switch located in series between the capacitive means and a rectifier means, responsive to the first signal, followed by opening the trapping switch and closing the starter switch responsive to the second signal, whereupon
the foregoing steps are repeated.

19. The method of transferring energy as defined in claim 18 wherein: preventing the reverse current from charging the capacitive means includes placing a diode electrically in parallel with the capacitive means so that a clamping circuit is formed.

20. The method of transferring energy as defined in claim 19 wherein generating the reverse current includes generating the reverse current from the opposing voltage and from an inductance.

21. An apparatus for transferring electrical energy unidirectionally from a voltage source to a load capacitor, comprising;

a bridge rectifier having load terminals and connection terminals;

the load capacitor electrically communicating with the load terminals of the bridge rectifier;

inductance means electrically communicating with the connection terminals of the bridge rectifier;

a primary capacitor electrically communicating with a clamping diode, to form a clamping circuit;

the clamping circuit electrically communicating with the inductance means;

the voltage source electrically communicating with at least one of the connection terminals of the bridge rectifier;

a starter diode switch for electrically communicating the voltage source and the clamping circuit; and a trapping diode switch for electrically communicating the clamping circuit and the bridge rectifier.

22. A unidirectional electrical energy transfer apparatus as defined in claim 21 further comprising:

an initial current measuring means for measuring an initial current flowing between the voltage source and the primary capacitor;

the starter diode switch for being closed when the initial current measuring means indicates the initial current has a magnitude, and for otherwise being open;

a reverse current measuring means for measuring a reverse current flowing between the clamping circuit and the bridge rectifier; and the trapping diode switch for being closed when the reverse current measuring means indicates that the reverse current has a magnitude, and for otherwise being open, whereby the starter diode switch and the trapping diode switch are not simultaneously either open or closed.

23. A unidirectional electrical energy transfer apparatus as defined in claim 22 wherein:

the inductance means includes a transformer having a primary winding and a secondary winding;

the secondary winding is connected to the connection terminals of the bridge rectifier;

the circuit having a remainder comprised of electrical elements other than the transformer, the bridge rectifier and the load capacitor; and the load capacitor and the bridge rectifier electrically communicate with the remainder of the circuit by means of the transformer.

* * * * *